May 24, 1949.  B. AMES  2,470,799
VENTILATOR
Filed Aug. 24, 1945
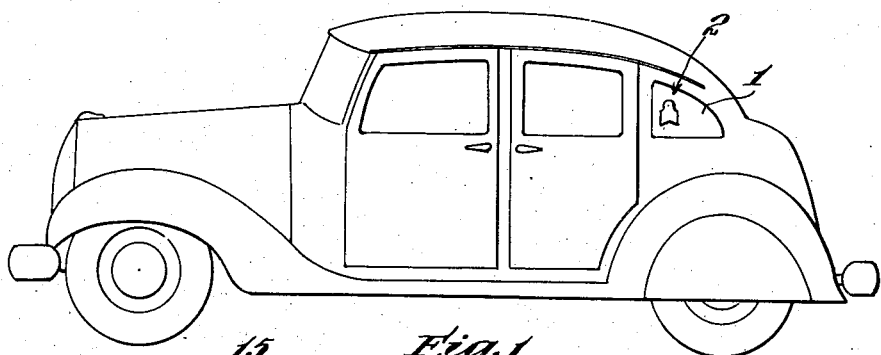
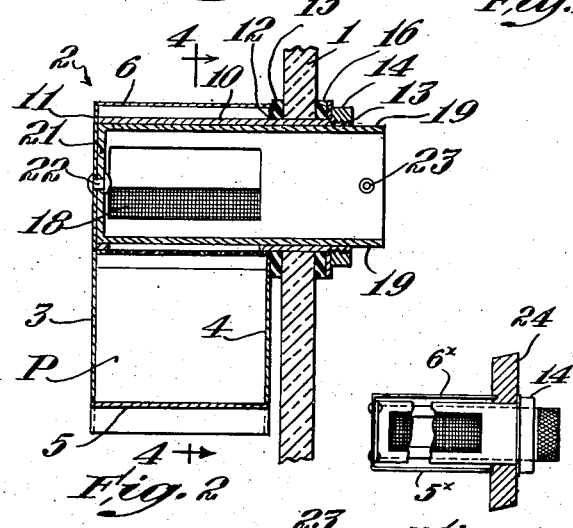
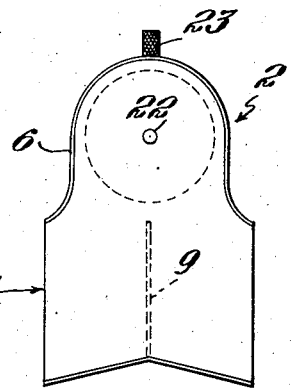
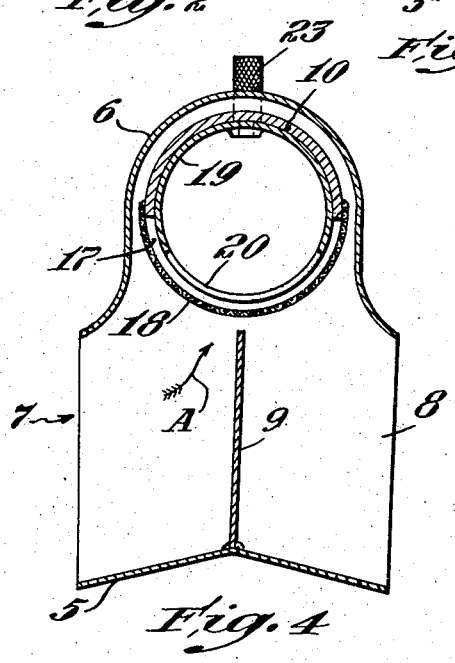
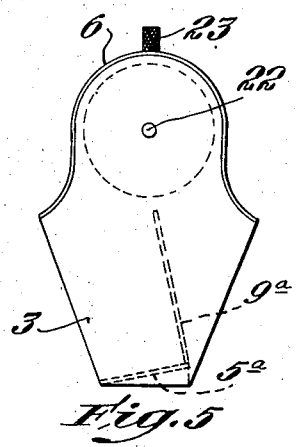
Inventor
Butler Ames
by Roberts Cushman & Grover
attys.

Patented May 24, 1949

2,470,799

UNITED STATES PATENT OFFICE 2,470,799

VENTILATOR

Butler Ames, Boston, Mass.

Application August 24, 1945, Serial No. 612,380

4 Claims. (Cl. 98—2)

This invention pertains to ventilation and more especially to air conditioning ventilators for vehicles, for instance automobiles, railway coaches, etc.

Although passenger cars commonly have ventilating means of one sort or another, the methods of ventilating and the amount of air which is customarily introduced into the interior of the car are far from sufficient to provide the optimum of comfort to passengers, and such air as does gain admission is usually loaded with dust, cinders or unpleasant odors. The usual passenger automobile is likewise deficient in respect to proper and comfortable ventilation, for while it has windows of ample capacity to admit all of the air requisite, the opening of a window usually results in the creation of drafts which are uncomfortable or which may even be injurious to some of the occupants of the vehicle. Under some circumstances there is produced a low pressure condition in the vehicle and a dangerous or at least disagreeable induction of exhaust gases, engine odors and dust may result.

The principal object of the present invention is to provide an efficient ventilator device, herein referred to as an air scoop, utilizing the inertia of some of the outside air passing near the surface of the vehicle, to force a regulable portion of such air into the vehicle and thereby building up within the vehicle a pressure slightly greater than that existing at its exterior, thus preventing the induction of exhaust gases, dirt, engine odors, etc., through the usual openings in the vehicle wall.

A further object is to provide such ventilating means capable of delivering air, in quantity, into the interior of the vehicle but which does not produce undesirable drafts, and which eliminates drafts which might normally result from an open window. A further object is to provide means for introducing air into the vehicle body without an accompanying introduction of rain and snow. A further object is to provide ventilating means which is operative to produce an inward flow of air, even though all of the windows be closed, for instance, during a storm; and even though the vehicle may be proceeding at a low speed or even stationary and which, in a preferred form, is designed to function equally well whether the vehicle be moving in one direction or the other. A further object is to provide a ventilating device which is effective to prevent the formation of frost on the windows by admitting a regulable supply of fresh dry outside air, but without forming drafts uncomfortable to the passenger. A further object is to provide ventilating means of this type, so devised that the occupant of the vehicle may reduce the amount of air admitted from the maximum possible volume down to a point at which no air at all is admitted. Other and further objects and advantages of the invention will be pointed out in the following more detailed description and by reference to the accompanying drawings wherein Fig. 1 is a side elevation, to small scale, showing the ventilator of the present invention applied to the window of an automobile;

Fig. 2 is a vertical section, to larger scale, showing the ventilator mounted in an aperture in the glass of the automobile window;

Fig. 3 is an elevation showing the ventilator, as viewed from the left-hand side of Fig. 2, the glass being omitted;

Fig. 4 is a section substantially on the line 4—4 of Fig. 2 with the valve sleeve rotated so that the opening therein is facing downwardly;

Fig. 5 is a view similar to Fig. 3, illustrating the ventilator designed to function when the vehicle is moving in one direction only; and Fig. 6 is a vertical section, to small scale, in the axial plane of the tubular support or conduit, showing the ventilator as modified for use in the window of a railway car.

That part of the outside air which passes close to the sides or surfaces of an enclosed vehicle is partially slowed by friction and is rolled into swirling eddies by irregularities or projections of the vehicle's surfaces. Since it is not desirable nor permissible in many instances for any portion of the ventilating apparatus to extend to any substantial distance outside of the wall of the vehicle, such part of the ventilating apparatus as does project beyond the vehicle wall must thus operate in the narrow belt of disturbed eddying air, and thus the inertia effect which must be depended upon for producing the desired inflowing air current may be very much reduced. In order to operate to the fullest advantage and with the air-collecting portion of the ventilating apparatus close to the outer surface of the vehicle wall, the apparatus must be so designed as to trap a portion of the air in a receiving scoop or funnel wherein the air will be more or less uniformly moving with such velocity that its inertia will insure its entry into the vehicle in opposition to such pressure as subsists within the vehicle. It is therefore preferable, for best results, that this air-gathering scoop be of substantially rectangular shape in vertical section, with parallel sides and secured with one of its vertical walls against the side of the vehicle, with the possibility of using the wall of the vehicle itself as one side of this air-gathering scoop. The scoop should be open both at front and rear so as to add the suction effect at the rear end to augment the entry of air into the front end of the scoop, and it should afford a passage long enough to dampen the disturbing eddies in the air which enters the scoop. The construction should be such as to prevent the entry of rain or snow into the vehicle, and should also have means for preventing the entry of solid particles such as dust, cinders or the like, and should be provided with regulating means whereby the amount of air entering the vehicle may readily be varied at the will of the passenger. Preferably the device should be so constructed that it will function whether the outside air be moving relatively to the vehicle in one direction or the other, although this is not a necessary feature.

Referring to the drawings, Fig. 1 shows the improved ventilating device of the present invention as applied to the rearmost side window of an automobile. For most effective results it has been found desirable to install the ventilator at a point in the side wall of the vehicle such that it is at about the level of the head of the seated passenger and a short distance forwardly of the passenger's face.

The improved ventilating device herein designated generally by the numeral 2 comprises a casing which in a preferred form has both outer and inner vertical side walls 3 and 4 parallel to each other and spaced apart to provide an air flue or passage between them, the casing also having a bottom wall 5. As illustrated (Fig. 4), the bottom wall preferably inclines upwardly to the mid-portion of the casing and then inclines downwardly to the opposite end of the casing. The casing also comprises the top wall 6 (Fig. 4) whose central portion is curved to a substantially semi-circular curvature, the walls 3 and 4 being properly shaped to conform to the curvature of the top wall 6 and to the inclined bottom wall 5. The parallel walls 3 and 4, together with the bottom wall 5, define a substantially rectangular air scoop, open at 7 and 8 at its opposite ends, respectively. When applied to the vehicle, the air passage or flue P is substantially parallel to the side of the vehicle, and, depending upon the direction of the outside air relatively to the vehicle, one or the other of the openings 7 or 8 is the entrance opening for the reception of air. Preferably a baffle or deflector plate extends up into the passage P from the bottom wall 5 so as to constrict the passage P and thereby cause the entering air to move upwardly. As shown in Fig. 4, the baffle extends vertically up from the point of intersection of the sloping portions of the bottom wall or floor 5 of the casing.

The casing is carried by a rigid tubular support or conduit 10 of cylindrical shape and which is coaxial with the arcuate portion of the top wall 6 of the casing. The wall 4 of the casing has an opening for the reception of the tubular support 10, and the walls 3 and 4 of the casing are rigidly and permanently united to the tubular support 10, for example by brazing, soldering or welding. The tubular support or conduit 10 is of a length greater than the width of the passage P and to provide a portion which may be passed through an opening in a wall element of the vehicle upon which the ventilator is to be mounted. In thus referring to the "wall element" of the vehicle, it is intended thereby to include a window pane, a special removable panel designed to be placed in a window opening beneath the sash, or a portion of the fixed opaque wall of the vehicle.

The inner end portion of the tubular conduit or support 10 is externally screw threaded at 13 (Fig. 2) for the reception of a clamping nut 14. In mounting the ventilator in the vehicle wall, the latter is provided with an opening of a diameter sufficient to receive the inner portion of the conduit 10. Preferably a resilient packing ring 15 is interposed between the outer surface of the vehicle wall and the outer surface of the casing wall 4, and a similar packing ring 16 is interposed between the inner surface of the vehicle wall and the clamping nut 14 (or a washer against which the nut bears). Having assembled the parts in this way, the clamping nut 14 is screwed up tightly, thereby rigidly clamping the tubular support 10 and the casing in proper position at the exterior surface of the vehicle wall.

The tubular support or conduit 10 is provided with an inlet opening 17 (Fig. 4) at that portion of the conduit which extends between the walls 3 and 4 of the casing. Preferably this opening 17 is of an arcuate extent of approximately 180°. This inlet opening 17 is guarded by a cylindrically curved screen 18 whose edges are preferably secured to the support 10 and to the walls 3 and 4 of the casing by soldering, welding or the like, and screen 18 being of a curvature concentric with that of the support 10.

Within the support 10 there is arranged a rotary cylindrical valve member 19 which fits within the tubular conduit or support 10 with an easy turning fit. This tubular valve 19 has an end closure 21 (Fig. 2) at its outer end, having a central aperture which receives a pivot stud 22 fixed in the wall 3 of the casing, the stud 22 having a head at its inner end so as to retain the valve 19 in position. The valve 19 is provided with a peripherally extending aperture or window 20 of a length substantially equalling the opening 17 which is preferably of substantially the same arc of curvature as the opening 17, though it may be less or greater if desired. The valve member 19 preferably extends inwardly beyond the inner end of the support 10, and this projecting inner end is furnished with a handle 23, for example a stud, screw-threaded into an opening of the wall of the valve 19 and located for convenient actuation by the occupant of the vehicle. As illustrated in Fig. 4, the inlet passage, constituted by the axial bore of the valve 19, is substantially tangent to the upper portion of the passage P extending through the lower part of the casing. The upper end of the baffle 9 is spaced a short distance, for example ⅛ of an inch, from the periphery of the screen member 18, so as to permit a small portion of the air entering, for example through the open end 7 of the air scoop, to flow, as shown by the arrow A, tangentially past the inlet opening 17 in the tubular support 10, thus sweeping away rain or snow which may fall on the baffle 9. The suction created at the rear end of the passage P assists in clearing rain and snow from the interior of the device. However, the greater proportion of the air will pass upwardly through the screen and through the air inlet 17 and through the window 20, if the latter be properly positioned, and into the interior of the valve member 19 and thence axially of the latter to the interior of the vehicle.

As above noted, the side walls 3 and 4 of the casing are parallel and the walls 5 and 6 are so shaped that the vertical cross section of the passage P does not substantially decrease from the entrance opening 7 rearwardly, until the passage is nearly blocked by the baffle 9. Thus, the air stream entering at 7 tends to become uniform and free of eddies and acquires a substantial velocity in a rearward direction until suddenly deflected by the baffle 9. The velocity of the moving air current (confined at its sides, top and bottom) is such as to produce a pressure at the surface of screen 18 sufficient to cause the air to enter and build up pressure within the vehicle such as to prevent undesirable entry of air or gas through partially open windows or through the crevices of the vehicle body. Even though the vehicle be stationary, the natural movement of outside air relatively to the vehicle is often sufficient to produce an inflow through the ventilator.

By manipulation of the handle 23 the occupant may set the window 20 so as to register with that part of opening 17 which is forward of baffle 9, thus assuring a maximum inflow of air, or he may so manipulate the handle 23 so as to register the window 20 with the rear part of the opening 17. In the latter case the entrance of air through the opening 20 is entirely cut off. Obviously, intermediate settings of the valve will produce intermediate effects.

The construction illustrated in Figs. 2, 3 and 4 is such that whether the outside air be moving relatively to the vehicle in one direction or the other, the same tendency to supply air to the interior of the vehicle will occur. Thus, such a device is of a special utility for use on a railway car which may be so coupled to the locomotive as to move in either direction. When thus employed, the ventilator of Figs. 2, 3 and 4 is just as effective whichever way the outside air may be moving, and no adjustment is required other than such manipulation of the handle 23 as may suit the wishes of the occupant of the seat nearest to the ventilator.

In Fig. 5 a slightly different construction is illustrated intended for use with a vehicle which goes in but one direction. In this arrangement the floor 5a of the casing slopes upwardly and rearwardly and the baffle extends upwardly and forwardly from the rear edge of the floor. The operation of the device is ordinarily the same as that of the preferred construction, although the inclined baffle 9a is somewhat more positive in its action in directing the incoming air upwardly than is the vertical baffle 9 of Fig. 4.

In Fig. 6 a slight further modification is illustrated showing a portable arrangement for use beneath a raised window sash, for example the window sash of a railway car. In this construction the casing, the supporting conduit and the controlling valve may be substantially as previously described except that in this instance the inner casing wall 4 is omitted and the top wall 6x and the bottom wall 5x are secured at their inner edges directly to a panel member 24 designed to be placed in a window aperture beneath the raised window sash. The tubular support is provided as in the previous instance with a clamping nut 14 which is tightened up against the inner surface of the panel 24 so as to secure the ventilator rigidly to the panel.

In using this device it is merely necessary to raise the window sash, place the panel 24 beneath the sash, and then close the sash down on the panel. The ventilator then provides for the introduction of air to the interior of the structure, for example a railway car, in the same way as the device above described. The device of Fig. 6 is of portable type, such for example as may be carried in a traveler's luggage, and designed to be inserted in the window of a railway coach when it is desired to secure ventilation without the usual accompaniment of cinders and dust.

While certain desirable embodiments of the present invention have been illustrated and described by way of example, it is to be understood that the invention is broadly inclusive of any and all modifications such as fall within the scope of the appended claims.

I claim:

1. An air conditioning ventilator designed to be attached to a wall element of a vehicle and to conduct air from the exterior to the interior of the vehicle so as to build up pressure within the vehicle and thereby prevent uncomfortable drafts from open windows, said ventilator comprising a scoop arranged at the outside of and closely adjacent to said wall element and facing in the direction of vehicle motion, said scoop defining a through passage within which a current of air is established which is substantially free from eddies and which acquires a substantial velocity in a rearward direction, a baffle extending up from the floor of said passage so as to block a part of the passage thereby to deflect a portion of the current of air passing through the passage laterally, a tubular conduit constituting a support for the air scoop, said conduit being designed to pass through an aperture in the wall element, means for rigidly clamping the conduit to the wall element, the conduit being situated laterally of and tangential to said passage and having a peripheral inlet opening near its point of tangency through which the laterally deflected air may enter it from the scoop, a screen guarding said inlet opening, a rotatable tubular valve member coaxial with the conduit and having an opening which may be placed into or out of registry with the inlet opening, and means at the interior of the vehicle for turning said valve member.

2. An air conditioning ventilator designed to be attached to a wall element of a vehicle and to force air from the exterior to the interior of the vehicle so as to build up pressure within the vehicle and thereby prevent uncomfortable drafts from open windows, said ventilator comprising a substantially cylindrical conduit designed to pass through an aperture in said wall element, means for clamping the conduit rigidly to the wall element, the conduit having an inlet opening in that portion of the conduit which is outside of the wall element, a casing having parallel side walls and which defines a substantially horizontal through flow passage of substantially rectangular vertical section and which is open at front and rear said casing being situated laterally of said conduit and substantially tangential thereto so that the upper wall of said passage is substantially concentric to that portion of said conduit which has the inlet openin, and a baffle within said passage arranged substantially perpendicular to the floor of the passage but which terminates short of said inlet opening so that part of the air continues through the passage and part is deflected into the inlet.

3. An air conditioning ventilator designed to be attached to a wall element of a vehicle and to conduct air from the exterior to the interior of the vehicle so as to build up pressure within the vehicle and thereby prevent uncomfortable drafts from open windows, said ventilator comprising a casing having parallel vertical walls which define the sides of an air scoop through which there is a passage of substantially uniform vertical section, the casing having a portion of its upper wall bent outwardly to encompass one end portion of a tubular conduit whose axis extends transversely of said passage, that portion of the periphery of the conduit within the casing closest to the passage being substantially tangent thereto, said conduit having an inlet opening in its periphery through which air may enter from the air scoop, the conduit extending outside of the casing and being designed to pass through an aperture in said wall element, means for securing the conduit to the wall element with the casing closely adjacent to the outer surface of the wall element, and a fixed baffle plate extending vertically part way across said passage but leaving the passage unobstructed adjacent to said inlet opening.

4. An air conditioning ventilator designed to be attached to a wall element of a vehicle and to conduct air from the exterior to the interior of the vehicle, said ventilator comprising a scoop arranged at the outside of and closely adjacent to said element, said scoop having parallel side walls and a bottom wall defining a horizontal passage having open ends through which a current of air is established by relative movement of the vehicle and the ambient air, and a top wall having a recess therein opening into the passage a conduit a portion of which enters the scoop and is situated entirely within the recess of the top wall for receiving air from said passage and conducting it to the interior of the vehicle, said conduit having an opening in its peripheral wall close to the junction between the recess and said passage and means in said passage for directing a part of the current of air at right angles to the passage to cause it to enter said opening while maintaining another part through the passage.

BUTLER AMES.

REFERENCES CITED

The following references are of record in the file of this patent:

UNITED STATES PATENTS

| Number | Name | Date |
|---|---|---|
| 656,247 | Gustafson | Aug. 21, 1900 |
| 932,490 | Noe | Aug. 31, 1909 |
| 997,806 | Haines | July 11, 1911 |
| 1,223,390 | Hynes | Apr. 24, 1917 |
| 1,463,294 | Robinson | July 31, 1923 |
| 1,836,438 | Bombard et al. | Dec. 15, 1931 |
| 1,982,747 | Kurth | Dec. 4, 1934 |

FOREIGN PATENTS

| Number | Country | Date |
|---|---|---|
| 610,763 | France | Sept. 13, 1926 |